US012420441B2

(12) United States Patent
Mourtada

(10) Patent No.: US 12,420,441 B2
(45) Date of Patent: Sep. 23, 2025

(54) DEVICE FOR ADJUSTING A BLADE OF A HAIR TRIMMER

(71) Applicant: Hassan Mourtada, Montreal (CA)

(72) Inventor: Hassan Mourtada, Montreal (CA)

( * ) Notice: Subject to any disclaimer, the term of this patent is extended or adjusted under 35 U.S.C. 154(b) by 343 days.

(21) Appl. No.: 18/147,758

(22) Filed: Dec. 29, 2022

(65) Prior Publication Data

US 2023/0136008 A1 May 4, 2023

Related U.S. Application Data

(63) Continuation-in-part of application No. 16/789,134, filed on Feb. 12, 2020, now Pat. No. 11,642,803.

(60) Provisional application No. 62/804,827, filed on Feb. 13, 2019.

(51) Int. Cl.

*B26B 19/48* (2006.01)
*B26B 19/06* (2006.01)
*B26B 19/20* (2006.01)
*B26B 19/38* (2006.01)

(52) U.S. Cl.

CPC .............. *B26B 19/48* (2013.01); *B26B 19/06* (2013.01); *B26B 19/205* (2013.01); *B26B 19/3826* (2013.01); *B26B 19/3846* (2013.01)

(58) Field of Classification Search

CPC ............ B26B 19/3826; B26B 19/3846; B26B 19/3893; B26B 19/205; B26B 19/04; B23Q 17/2225; B23Q 17/2216

USPC ...... 33/567, 567.1, 613, 641, 645, 626, 633, 33/344, 628; 269/135, 86; 30/200

See application file for complete search history.

(56) References Cited

U.S. PATENT DOCUMENTS 3,280,468 A * 10/1966 Rangus ............... B26B 19/3846 30/200
3,334,416 A * 8/1967 Green ..................... B26B 19/20 30/200
3,344,520 A * 10/1967 Williams ................ B26B 19/20 30/200
4,590,677 A * 5/1986 Kopp ....................... B25H 7/04 33/42
7,249,552 B2 * 7/2007 Hines ................... B23D 51/025 83/761
7,290,349 B1 * 11/2007 Carpenter ........... B26B 19/3846 30/200
7,350,314 B2 * 4/2008 McCambridge .... B26B 19/3846 33/633
8,806,757 B2 * 8/2014 Moseman ........... B26B 19/3846 30/208
9,089,979 B2 * 7/2015 Hodge ................ B26B 19/3826
9,144,913 B2 * 9/2015 Gross .................. B26B 19/3893
9,545,729 B2 * 1/2017 Buck, Jr. ............... B26B 19/205

(Continued)

*Primary Examiner* — Laura M Lee

(74) *Attorney, Agent, or Firm* — Benoit & Côté Inc.; Danny Higgins

(57) ABSTRACT

An adjusting device for adjusting a blade of a hair trimmer where the blade of the hair trimmer has a dynamic cutter blade and a static comb blade. The adjusting device comprises a base, an adjuster pivotably connected to the base, a locator for locating the blade and a biasing means for biasing the blade against the adjuster. The adjuster has a comb-contacting face at a first radial distance from its rotation axis while a cutter-adjusting face is at a second radial distance from the rotation axis, the second radial distance being larger than the first radial distance. By rotating the adjuster, a clearance is created between the cutter blade and the comb blade.

11 Claims, 4 Drawing Sheets

(56) References Cited

U.S. PATENT DOCUMENTS

| | | | | |
|---|---|---|---|---|
| D785,249 | S * | 4/2017 | Torres | D28/54 |
| D903,196 | S * | 11/2020 | Carlucci | D28/54 |
| 11,104,017 | B2 * | 8/2021 | Carlucci | B26B 19/063 |
| 11,642,803 | B2 * | 5/2023 | ElZein | B26B 19/205 30/201 |
| 2012/0198716 | A1 * | 8/2012 | Tonges | B26B 19/3846 33/641 |
| 2014/0115865 | A1 * | 5/2014 | Gross | B26B 19/3893 29/281.5 |
| 2015/0158189 | A1 * | 6/2015 | Hodge | B26B 19/3846 33/633 |
| 2020/0376694 | A1 * | 12/2020 | Carlucci | B26B 19/06 |
| 2023/0136008 | A1 * | 5/2023 | Mourtada | B26B 19/48 30/201 |
| 2023/0286181 | A1 * | 9/2023 | Al-Ansari | B26B 19/3806 |

* cited by examiner

DEVICE FOR ADJUSTING A BLADE OF A HAIR TRIMMER

CROSS REFERENCE TO RELATED APPLICATION

The present application is a Continuation-in-Part of U.S. patent application Ser. No. 16/789,134 which takes priority from and claims the benefit of U.S. Provisional Patent Application Ser. No. 62/804,827 filed on Feb. 13, 2019, the contents of which are herein incorporated by reference.

FIELD OF THE INVENTION

The present invention generally relates to the field of hair trimmers. More specifically, the invention relates to an adjusting device allowing to adjust a clearance between a reciprocating cutter blade and a static comb blade of the blade of a hair trimmer.

BACKGROUND OF THE INVENTION

Users and barbers use hair trimmers of different sizes and shapes. The hair trimmer has a dynamic cutter blade which slides in a reciprocating movement on top of a static comb blade that is in contact with the skin of a user. In order to prevent cutting through skin, the extremity of the dynamic cutter blade must be adjusted at a very small distance behind that of the static comb blade. This distance, known as clearance, is makes much of a difference on the quality of shaving and is therefore very important to barbers to ensure fine, smooth and safe shaving.

Properly adjusting the clearance is not easy however, let alone adjusting it for different models of blades from different manufacturers. Some manufacturers provide an adjuster specific to their blade models, but that nevertheless forces barbers to purchase different adjusters for their different trimmers. There is therefore a need for a trimmer adjuster which can accommodate different blade models.

SUMMARY OF THE INVENTION

It is an object of the present invention to provide an adjusting device for adjusting a blade of an electric trimmer that overcomes or mitigates one or more disadvantages of known blade adjusting devices, or at least provides a useful alternative.

The invention provides the advantages of being adapted to adjust a variety of blades for electric trimmers from different manufacturers.

In accordance with an embodiment of the present invention, there is provided an adjusting device for adjusting a blade of an electric hair trimmer where the blade of the electric trimmer has a dynamic cutter blade and a static comb blade. The adjusting device comprises a base, an adjuster, a locator and a biasing means. The base has a transversal axis, a longitudinal axis and a receiving surface for receiving the comb blade. The adjuster has a comb-contacting face, a cutter-adjusting face and a rotation axis. The adjuster is pivotably connected to the base so that the rotation axis is parallel with the transversal axis of the base. The comb-contacting face is at a first radial distance from the rotation axis while the cutter-adjusting face is at a second radial distance from the rotation axis. The second radial distance is larger than the first radial distance. The locator is connected to the base and is movable along the longitudinal axis of the base. The locator has a receiving portion configured to receive and to locate a non-cutting extremity of the static comb. The biasing means is operable to bias the static comb against the comb-contacting face of the adjuster via the locator. The cutter-adjusting face is operable to displace the cutter blade with respect to the comb blade by pivoting the adjuster around the rotation axis.

The receiving surface of the base may be flat.

Optionally, the adjusting device may further comprise a locking mechanism operable to selectively prevent the locator from moving with respect to the base. The locking mechanism may be connected to the biasing means and to the base.

Optionally, the rotation axis of the adjuster may be substantially co-planar with the receiving surface of the base.

Optionally, the cutter-adjusting face of the adjuster may be located above the rotation axis and above the receiving surface of the base. The cutter-adjusting face may have a curved profile in a cross-sectional plane normal to the rotation axis. This curved profile may have increasing second radial distances.

Optionally, the receiving portion of the locator may comprise a ramp and a lip. The lip is positioned proximate an upper portion of the ramp so that the non-cutting extremity of the blade is displaced along the ramp up to the lip under a bias of the biasing means.

Optionally, the biasing means may be connected between the locator and the base in order to bias the locator substantially along the longitudinal axis of the base. The biasing means may be a spring.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to an adjusting device for adjusting the blades of a hair trimmer that is suited for accepting different models of blades from different manufacturers.

Figure 1:
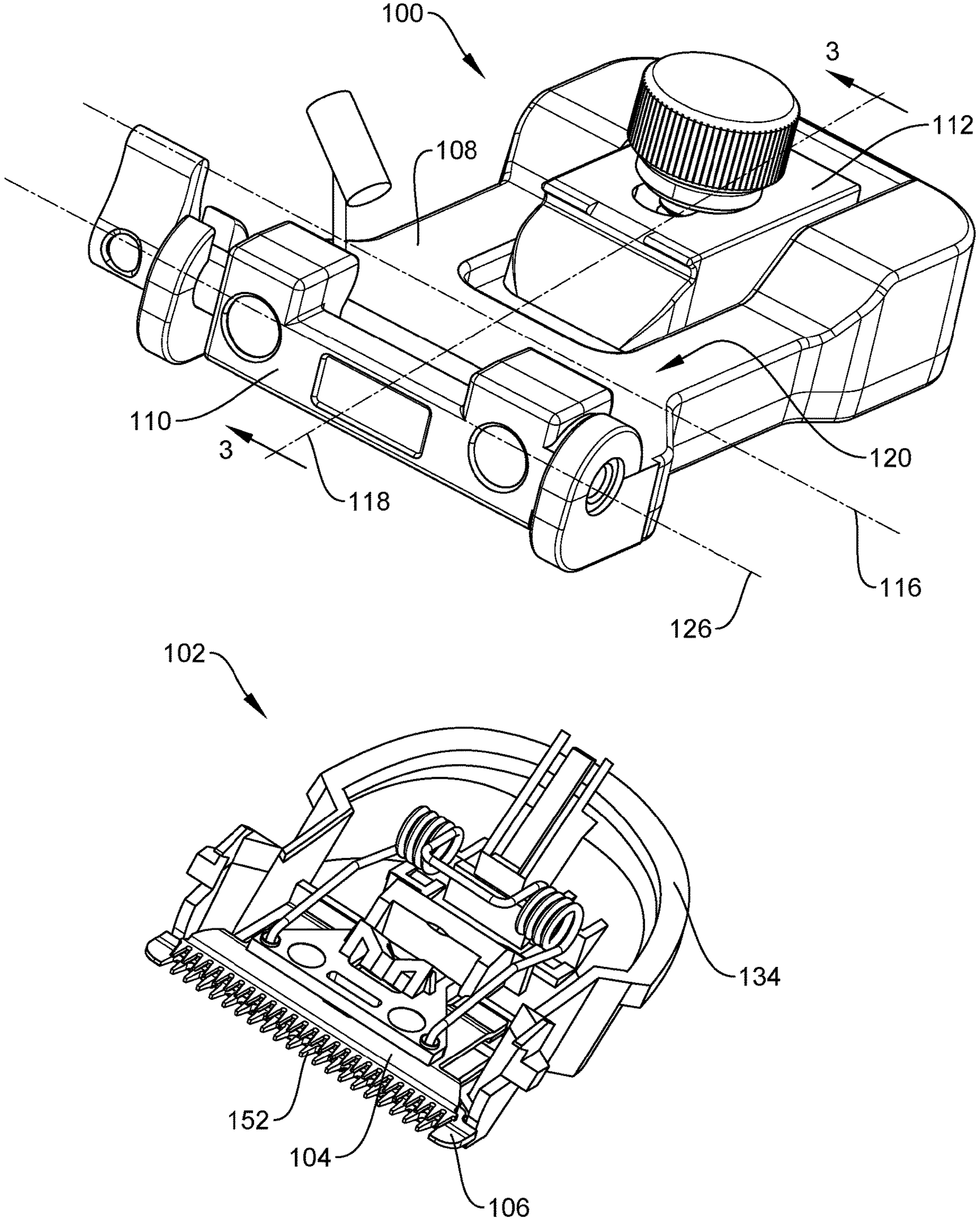
FIG. 1 is a perspective view from the front of a blade adjusting device in accordance with an embodiment of the invention.

FIG. 1 is referred to. An adjusting device 100 for adjusting a blade 102 of an electric trimmer is depicted. The blade 102 of the electric trimmer has a reciprocating cutter blade 104 and a static comb blade 106. The adjusting device 100 comprises a base 108, an adjuster 110, a locator 112 and a biasing means 114, best shown in FIGS. 2, 3 and 4, now concurrently referred to. The base 108 has a transversal axis 116, a longitudinal axis 118 and a receiving surface 120 for receiving the comb blade 106. The receiving surface 120 of the base 102 is typically flat, or at least provides a flat supporting surface. The adjusting device 100 may be made of plastic or of metal.

Figure 2:
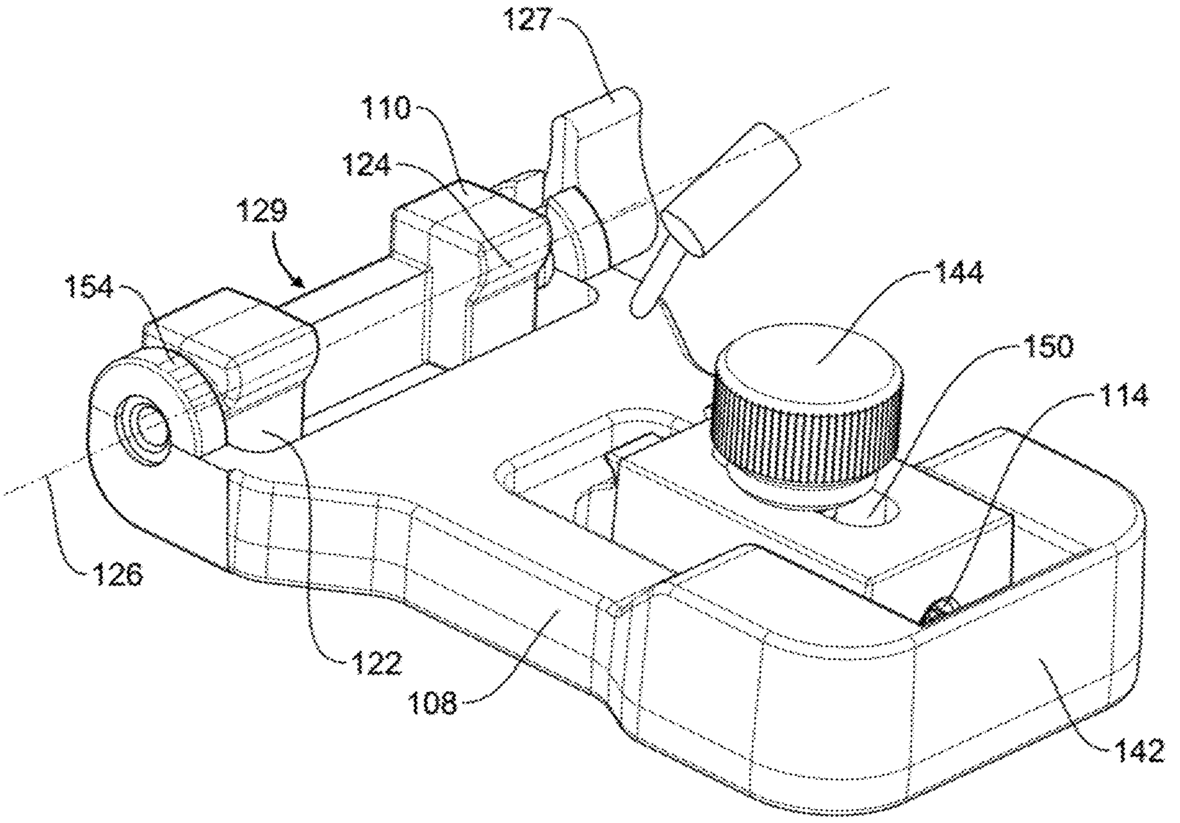
FIG. 2 is a perspective view from the back of the blade adjusting device of FIG. 1.

The adjuster 110 comprises two portions for contacting the blade 102: a comb-contacting face 122 and a cutter-adjusting face 124, best shown in FIG. 2. A lever 127 is also connected to, or part of, the adjuster 110 to provide leverage so the user can more easily rotate the adjuster 110. The comb-contacting face 122 serves as a stopper against which the comb blade 106 rests. In certain models of blade 102, it is also possible that the cutter blade 104 also contacts the comb-contacting face 122 when the comb-contacting face 122 is in a substantially vertical orientation. The comb-contacting face 122 may be flat or curved. If curved, the comb-contacting face 122 adopts a semi-cylindrical surface, at least locally where it is intended to contact the comb blade 106. This semi-cylindrical shape is of a circular cross-section with a constant radius centered on a rotation axis 126, the axis around which the adjuster 110 rotates. The rotation axis 126 is typically placed substantially co-planar or in a parallel plane slightly above the receiving surface 120 by a few millimeters (typically between 0 to 2 mm, corresponding to 0 to 0.078 in), and parallel with the transversal axis 116. The cutter-adjusting face 124 is adapted to contact the cutter blade 104, above the rotation axis 126 and above the receiving surface 120. The cutter-adjusting face 124 may adopt a straight or curved profile 146. Such a curved profile 146 is shown in a plane of the cross-sectional view of FIG. 3, which is normal to the rotation axis 126. Being located above the comb-contacting face 122, that is closer to the cutter blade 104 itself resting above the comb blade 106, the cutter-adjusting face 124 is positioned to contact the cutter blade 104 first without contacting the comb blade 106. Each point along the profile 146 which may potentially contact the cutter blade 104 is located at a gradually increasing radial distance from the rotation axis 126, thereby allowing gradually pushing the cutter blade 104 along the comb blade 106. As can be seen, any first radial distance 128, which is the radial distance of any point along the profile 146 to the rotation axis 126 is larger than any second radial distance 130, which is the radial distance of any point along the comb-contacting face 122 to the same rotation axis 126.

Figure 4:
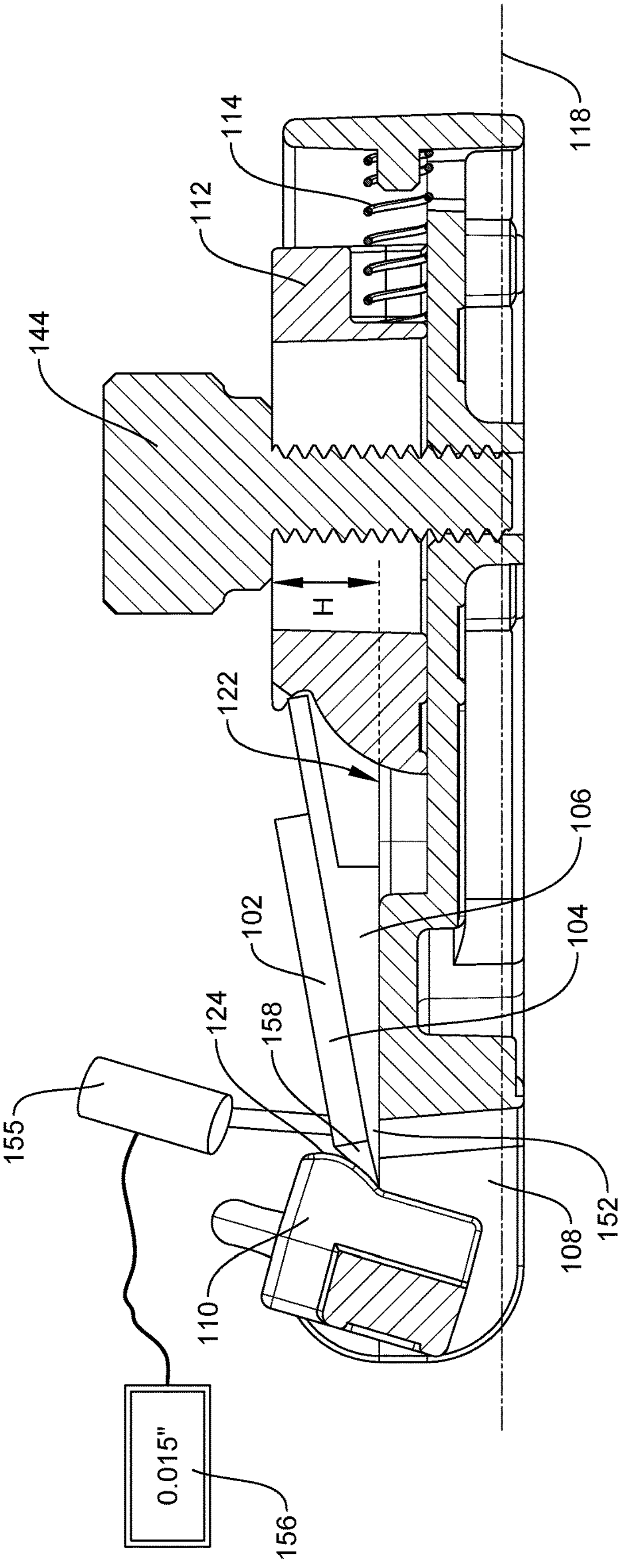
FIG. 4 a is a sectional side view along section 3-3 of the blade adjusting device of FIG. 1 showing the dynamic cutter adjusted in a second position.

Adjustment of the cutter blade 104 with respect to the comb blade 106 is achieved by rotating the adjuster 110 around its rotation axis 126. This is shown in FIG. 4. Further rotating the adjuster 110 pushes further the cutter blade 104 with respect to the comb blade 106 and thereby further increase the gap, also known as clearance, between the respective tips of the cutter blade 104 and the comb blade 106. The exact geometry of the adjuster 110 and of the blade 102 influence how the cutter blade 104 moves with respect to the comb blade 106. Consequently, the clearance between the cutter blade 104 and the comb blade 106 may not increase proportionally with the rotation angle of the adjuster 110.

Although the cutter-adjusting face 124 is intended to only contact the cutter blade 104 when adjusting, it is possible that the comb-contacting face 122 also marginally displaces the comb blade 106. The important point is that the cutter-adjusting face 124 displaces more the cutter blade 104 than the comb-contacting face 122 displaces the comb blade 106. Hence, the objective is to create a relative displacement of the cutter blade 104 with respect to the comb blade 106.

Conveniently, the adjuster 110 is provided with an opening 129 so the user can see through and witness the effect of rotating the adjuster 110 on the position of the cutter blade 104, and visually assess the clearance. As such clearance is very small, the opening 129 allows the user to use a magnifying glass or a camera of a mobile phone for zooming.

The locator 112 is movable along the longitudinal axis 118 of the base 108, guided by a channel 131. The locator 112 has a receiving portion 132 configured to receive and to locate a rear portion of the blade 102, and particularly its non-cutting extremity 134. Although it depends on the design of a particular blade model, the rear portion of one blade 102 is often constituted of the rear portion, or non-cutting extremity 134, of the comb blade 106. The receiving portion 132 of the locator 112 comprises a ramp 136 ending with a retaining lip 138. The lip 138 is positioned proximate an upper portion of the ramp 136 so that, when positioned, the non-cutting extremity 134 of the blade 102 is guided along the ramp 136 up to the lip 138 under a force exerted by the biasing means 114. The intersection of the ramp 136 with the lip 138 creates an interior corner 139 designed to hold the non-cutting extremity 134 in place. The location of this corner 139 above the receiving surface 120 determines a height at which rests the non-cutting extremity 134 of the blade 102. This height is determined so that a bottom 140 of the comb blade 106 rests substantially flat on the receiving surface 120 of the base 108. It has been found that a distance H between the corner 139 and the receiving surface 120 of approximately 5 mm (0.197 in) suits most brands of blades. If this distance H of 5 mm (0.197 in) does not suit a specific model of blade 102, it is possible to increase the height of the corner 139 by inserting shims under the locator 112. Alternatively, it is possible to use thinner or thicker locators 112 to best suit different blade models.

The biasing means 114 is typically connected between the locator 112 and the base 108, and more particularly between the locator 112 and a back wall 142 of the base 108. So positioning the biasing means 114 allows pushing, or biasing, the locator 112 towards the adjuster 110 substantially along the longitudinal axis 118 of the base 108. Different types of biasing means 114 may be used, typically a spring which can be a coil spring, a leaf spring, in fact basically any type of suitable spring known in the art made of a metal or plastic. A spring made of a resilient material such as rubber may also be suitable.

In order to prevent the locator 112 from being pushed back when rotating the adjuster 110, the adjusting device may be provided with a locking mechanism 144. The locking mechanism 144 prevents the locator 112 from moving with respect to the base 108. The locking mechanism 144 is typically connected between the locator 112 and the base 108. In the present example, the locking mechanism 144 is a screw passing in a slot 150 of the locator 112 and engaging threads in the base 108. The screw can be tightened, thereby preventing the locator 112 from moving.

Figure 3:
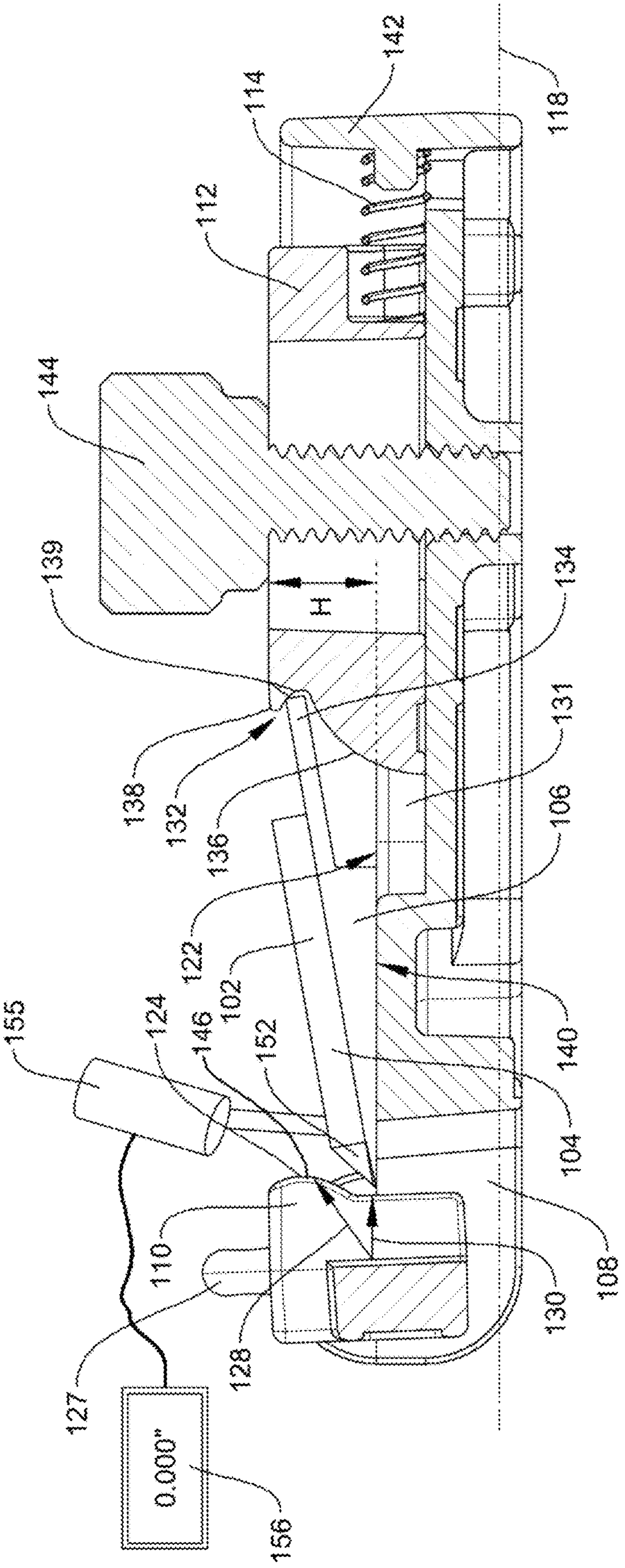
FIG. 3 is a sectional view along section 3-3 of the blade adjusting view of FIG. 1 showing a dynamic cutter of a blade adjusted in a first position.

A dial 154 may be shown on a face of the base 108 and in proximity to the adjuster 110 to indicate the displacement of the adjuster 110, which in turn is an indication of the relative displacement of the cutter blade 104 with respect to the comb blade 106. This dial 154 may be a set of corresponding marks on the adjuster 110 and the base 108 as shown in FIG. 2. The corresponding marks may simply be unitless reference marks, may be sequentially-marked marks, may indicate an angular value of the angle of the adjuster 110 with respect to the base 106, or may indicate the actual displacement value (according to the metric system or to the imperial system) of the cutter blade 104 with respect to the comb blade 106, for example in tenth of millimeter increments. An alternative way of displaying this information provided by the dial is through the use of a sensor 155 capable of reading or interpreting the movement of the cutter blade 104 and connected to a digital readout 156 as shown in FIGS. 3 and 4. The sensor 155 can be a displacement sensor (linear or rotation displacement) or an optical sensor. The sensor may read the movement of the cutter blade 104 directly, that is by being in direct contact or aiming directly at the cutter blade 104 when in place in the adjusting device 100, or indirectly, that is by monitoring, being in contact or aiming at the adjuster 110 and interpreting the movement of the cutter blade 104 through the movement of the adjuster 110.

In use, the user places the non-cutting extremity 134 of the blade 102 along the ramp 136 of the locator 112 until the non-cutting extremity 134 reaches the corner 139. While still holding the blade 102, the user pushes the locator 112 towards a back of the adjusting device 100, thereby compressing the biasing means 114. A cutting extremity 152 of the blade 102 is then lowered so that the bottom 140 of the comb blade 106 lays substantially flat against the receiving surface 120 of the base 108. The biasing means 114 then pushes the blade 102 against the adjuster 110. If the blade 102 already had a clearance between the cutter blade 104 and the comb blade 106 and if the adjuster 110 is in its raised or starting position such as in FIG. 3, only the comb blade 106 should contact the adjuster 110, and more particularly the comb-contacting face 122. The locator 112 is then locked into place with the locking mechanism 144. The cutter blade 104 is loosened from the comb blade 106 so that it can be adjusted. If not already in contact, the cutter blade is brought forward in contact with the cutter-adjusting face 124. The adjuster 110 is then rotated to an adjusting position as depicted in FIG. 4, so that the cutter-adjusting face 124 pushes the cutter blade 104 towards the non-cutting extremity 134 of the blade 102. This creates the clearance gap between the cutter blade 104 and the comb blade 106. Once the desired clearance between the cutting extremities of both the comb blade 106 and the cutter blade 104 is achieved, the cutter blade 104 is tightened against the comb blade 106. The locator 112 is pulled back by loosening the locking mechanism 144, thereby allowing the removal of the blade 102 from the adjusting device 100.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. An adjusting device for adjusting a blade of a hair trimmer, the blade having a dynamic cutter blade and a static comb blade, the device comprising:

a base, the base having a transversal axis, a longitudinal axis and a receiving surface for receiving the comb blade;

an adjuster, the adjuster having a comb-contacting face and a cutter-adjusting face, the adjuster being pivotably connected to the base through a pivot having a rotation axis, the rotation axis being parallel with the transversal axis of the base, the comb-contacting face being at a first radial distance from the rotation axis and the cutter-adjusting face being at a second radial distance from the rotation axis, the second radial distance being larger than the first radial distance;

a locator, the locator being connected to the base and being movable along the longitudinal axis of the base, the locator having a receiving portion configured to receive and to locate a non-cutting extremity of the blade; and a biasing means, the biasing means being operable to bias the comb blade against the comb-contacting face of the adjuster via the locator, wherein the cutter-adjusting face is operable to displace the cutter blade with respect to the comb blade by pivoting the adjuster around the rotation axis.

2. The adjusting device of claim 1, wherein the receiving surface of the base is flat.

3. The adjusting device of claim 1, further comprising a locking mechanism operable to selectively prevent the locator from moving with respect to the base.

4. The adjusting device of claim 3, wherein the locking mechanism is connected to the biasing means and to the base.

5. The adjusting device of claim 1, wherein the rotation axis of the adjuster is substantially co-planar with the receiving surface of the base.

6. The adjusting device of claim 1, wherein the cutter-adjusting face of the adjuster is located above the rotation axis and above the receiving surface of the base.

7. The adjusting device of claim 1, wherein the cutter-adjusting face has a curved profile in a cross-sectional plane normal to the rotation axis.

8. The adjusting device of claim 7, wherein the curved profile has increasing second radial distances.

9. The adjusting device of claim 1, wherein the receiving portion of the locator comprises a ramp and a lip, the lip being positioned at an upper portion of the ramp so that the non-cutting extremity of the blade is displaced along the ramp up to the lip under a bias of the biasing means.

10. The adjusting device of claim 1, wherein the biasing means is connected between the locator and the base to bias the locator substantially along the longitudinal axis of the base.

11. The adjusting device of claim 1, wherein the biasing means is a spring.

* * * * *